United States Patent [19]

Kuragano et al.

[11] Patent Number: 5,363,477
[45] Date of Patent: Nov. 8, 1994

[54] METHOD FOR DISPLAYING AN IMAGE OF AN OBJECT SURFACE USING A LUMINANCE TRANSFORMATION IN ACCORDANCE WITH A NON-LINEAR CHARACTERISTIC

[75] Inventors: Tetsuzo Kuragano, Tokyo; Saga Fumie, Kanagawa, both of Japan

[73] Assignee: Sony Corporation, Tokyo, Japan

[21] Appl. No.: 784,926

[22] Filed: Oct. 30, 1991

[30] Foreign Application Priority Data

Nov. 1, 1990 [JP] Japan ................... 2-293531

[51] Int. Cl.$^5$ .................. G06F 15/72; G06F 15/62
[52] U.S. Cl. .................. 395/126; 395/132; 395/131
[58] Field of Search ......... 395/131, 126, 132, 129, 395/161; 358/80, 518, 520, 521; 340/703, 701; 345/153, 150

[56] References Cited

U.S. PATENT DOCUMENTS

| | | | |
|---|---|---|---|
| 4,695,832 | 9/1987 | Jacobson | 340/703 X |
| 4,928,250 | 5/1990 | Greenberg et al. | 395/126 |
| 4,958,272 | 9/1990 | Wake | 395/132 |
| 4,972,257 | 11/1990 | Birnbaum et al. | 358/80 |
| 5,012,333 | 4/1991 | Lee et al. | 358/80 |
| 5,067,098 | 11/1991 | Moellering et al. | 395/126 |
| 5,103,407 | 4/1992 | Gabor | 395/131 |
| 5,249,263 | 9/1993 | Yanker | 395/131 |
| 5,283,858 | 2/1994 | Moellering et al. | 395/126 |

FOREIGN PATENT DOCUMENTS

WO89/01206 2/1989 WIPO.
WO90/12369 10/1990 WIPO.

*Primary Examiner*—Raymond J. Bayerl
*Attorney, Agent, or Firm*—Limbach & Limbach

[57] ABSTRACT

A method for displaying an image of an object surface on a screen in which a non-linear transformation is applied to the luminance value at points on the surface of the object in accordance with an illumination model, accounting for only ambient light and diffusedly reflected light. Lighter and darker portions of the surface are emphasized to express glossiness of the surface in a simulated manner. Color of the image can be designated by selecting a point in a chart having a fixed value of lightness of a color cube, the color cube having coordinate axes representing hue, lightness, and saturation of color.

3 Claims, 15 Drawing Sheets

METHOD FOR DISPLAYING AN IMAGE OF AN OBJECT SURFACE USING A LUMINANCE TRANSFORMATION IN ACCORDANCE WITH A NON-LINEAR CHARACTERISTIC

BACKGROUND OF THE INVENTION

A. Field of the Invention

The present invention relates to an image displaying method for use in computer graphics and, more particularly, to a method for displaying luminance to obtain an image expressing glossiness of a surface of an object and/or a method for designating a color of the image.

B. Prior Art

In the technical field of computer graphics, a shading treatment is generally applied to an image of an object to be displayed so that texture of the surface of the object may be represented.

Except where all or part of the light incident on an object is transmitted through the object, that is where the object is lucent or transparent, representation of object surface texture depends on representing diffusedly reflected light and specularly reflected light.

Further, in practice, a method for calculating the luminance at points on the object's surface which accounts for ambient light greatly contributes to the representation of surface texture.

Generally, when a shading is used to represent texture the calculation of the luminance on the object's surface is performed according to an illumination model expression.

A simple and easily calculable illumination model expression is known in the art, a first term accounting for ambient light and a second term accounting for diffusedly reflected light according to Lambert's Cosine law. That is, $$I = k_a I_a + k_d \sum_{j=1}^{m} I_j \cos\theta_j \qquad (1)$$

where $I$: luminance at a point on the surface of an object
$k_a$: reflection coefficient of ambient light, $(0 \leq k_a \leq 1)$ $I_a$: luminance of ambient light
$k_d$: diffuse reflection coefficient
$I_j$: luminance of the jth light source, $(0 \leq j \leq m, 0 \leq I_j \leq 1)$ $\theta_j$: the angle formed between a direction vector Lj of the jth light source and a normal vector N at the point (refer to FIG. 11).

However, since glossiness of an object is produced by specularly reflected light, the texture of a glossy surface of an object cannot be represented safely by the luminance expression expressed above.

An expression for representing the texture of a glossy surface of an object, is known in the art (2), which is obtained by adding to the expression (1) an experimental model expression for specularly reflected light by Bui-Tuong-Phong. That is, $$I = k_a I_a + \sum_{j=1}^{m} I_j(k_d \cos\theta_j + k_s \cos^n \alpha_j) \qquad (2)$$

where
$k_s$: specular reflection coefficient $(k_s = 1 - k_d, 0 \leq k \leq 1)$

: index representing expanse of specularly reflected light. In particular $1 \leq n$, and the larger the value of n, the more spotlight-like is the specularly reflected light $\alpha_j$: an angle formed between the jth specularly reflected light vector (i.e., the reflection of the jth light-source direction vector across the normal vector N at the point) Lj and a visual-point direction vector E (refer to FIG. 12).

In computer graphics, the color of the surface of an object is represented by a combination of three numerical elements. Some of these three-element representations are known in the art as RGB (Red, Green, Blue), HSV (Hue, Saturation, Value), and HLS (Hue, Lightness, Saturation).

By representing a color by a combination of three numerical elements as described above, color designation of a displayed image can be made by introducing a concept of a three-dimensional body (color cube) with the three numerical elements being designated along the body's three coordinate axes.

For example, a color of RGB representation becomes a cube having R, G, and B, respectively as the axes as shown in FIG. 13. With such an RGB cube, neutral colors (white-gray-black) exist in a diagonal connecting the point of black to the point of white.

With a hexagonal pyramid three element representation, having the diagonal of the color cube of the above described RGB representation, where neutral colors exist and are used as the axis of the value, a hexagonal-pyramid color cube of HSV representation as shown in FIG. 14 is obtained.

When the above described color cube of HSV representation having the point of black as its vertex is further developed into a bicone having the points of black and white as its vertices, a color cube of HLS representation as shown in FIG. 15 is obtained.

Color designation of an image to be displayed graphically has conventionally been made by designating three elements individually. For example, as shown in FIG. 16, by having the circular display area AR$_1$ provided for displaying H (hue), a horizontal strip area AR$_2$ below the hue display area AR$_1$ provided for displaying S (saturation), and a horizontal strip area AR$_3$, below AR$_2$ provided for displaying L (lightness), the color designation of an image to be displayed may be made by individually designating H (hue), S(saturation), and L (lightness) on display areas AR$_1$, AR$_2$, and AR$_3$ respectively. Further, a hue display for fine adjustment of H (hue) may be provided in the vertical strip area AR$_4$ to the right-hand side of the hue display area AR$_1$ so that a fine adjustment of H (hue) can be achieved by designating a fine adjustment of hue on display area AR$_4$.

Further, in applying a shading treatment to a displayed object in computer graphics, a process as for changing only the lightness (luminance) of a color designated by an HSV representation or an HLS representation is known in the art.

If in applying a shading treatment to an image of an object to be displayed to thereby express texture of the surface of the object as described above, the calculation of luminance on the surface of the object is performed in accordance with an illumination model expression which considers only ambient light and diffusedly reflected light glossiness of the surface of the object, produced by specularly reflected light cannot be taken into account. Further, even if an illumination model expression with ambient light, diffusedly reflected light, and specularly reflected light taken into consideration is employed to express the glossiness of the surface of the object, a difficulty arises in that it takes a very long time to calculate the expression values.

Besides, with prior art techniques, although only V or L may be changed with H and S kept unchanged for color designations made by HSV representation or HLS representations respectively, the original color designation of the displayed image has nevertheless been made by individually designating the three elements as described above, and therefore vast amounts of labor and time are expended to designate a desired color.

Therefore it is an object of the present invention to provide a method for displaying an image employing an illumination model expression with only ambient light and diffusedly reflected light taken into consideration, but being capable of representing surface glossiness.

Another object of the present invention, is to provide a method of image of color designation which may be performed simply and quickly .

SUMMARY OF THE INVENTION

According to a method of the present invention, for displaying luminance of an image, a nonlinear transformation treatment is applied to the luminance value of the surface of an object calculated in accordance with an illumination model expression with only ambient light and diffusedly reflected light taken into consideration to display an image in which lighter and darker portions of the surface of the object are emphasized. It is thereby made possible to simulate the glossiness of an object's surface and, in addition, to calculate the luminance value on the surface of the object effectively in a short time. According to a method of the present invention for designating color of an image hue and saturation can be selected by a single operation of selecting a point in a cross-section, having a fixed value of lightness, of a color cube whose coordinate axes represent hue, lightness, and saturation of color. Therefore, any color can be designated simply and effectively.

DESCRIPTION OF THE PREFERRED EMBODIMENTS

Figure 1:
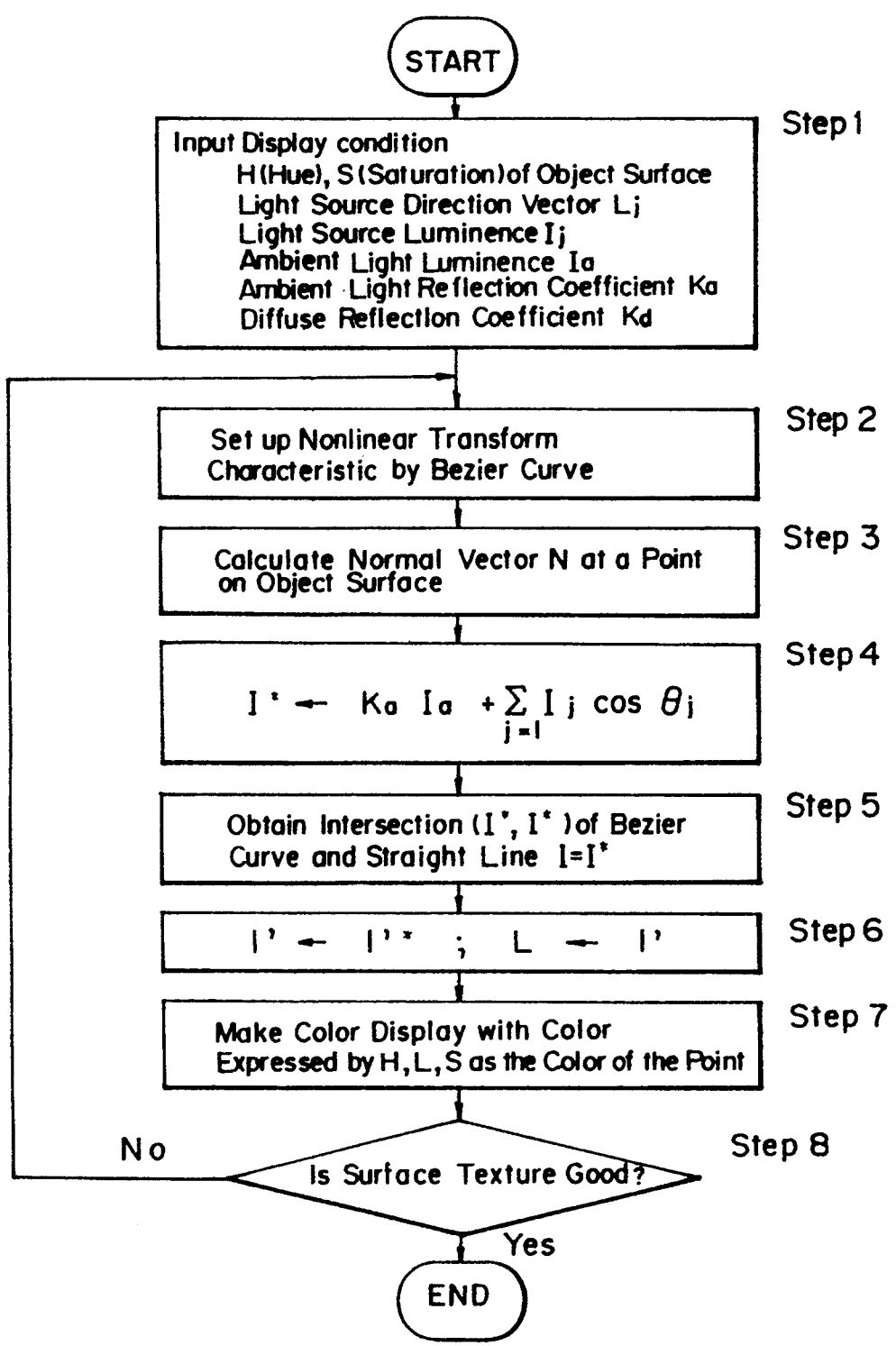
FIG. 1 is a flow chart showing steps for displaying an image according to a method of the present invention.

In the method for displaying an image according to the present invention, display of an image representing a glossy-surface object is performed according to the procedure shown in the flow chart of FIG. 1.

The flow chart of FIG. 1 shows a procedure in which a light source is arranged to be a parallel light source, the luminance value on the surface of the object is calculated according to the above mentioned illumination model expression (1), and a nonlinear transformation is performed according to a Bezier curve of third order. In the procedure shown in the flow chart of FIG. 1, the color designation for the surface of the object is performed by HLS (Hue, Lightness, Saturation) representation, while H (hue) and S (saturation) on the surface of the object are be kept constant. The aforesaid color designation for the surface of the object is performed according to the procedure of the later described flow chart of FIG. 3.

First, in the step 1, H (hue) and S (saturation) of the surface of the object to be displayed are designated, and the light-source direction vector $L_j$, light-source luminance $I_j (1 \leq j \leq m)$, ambient light luminance $I_a$, ambient light reflection coefficient $k_a$, and the diffuse reflection coefficient $k_d$ are designated.

Figure 2:
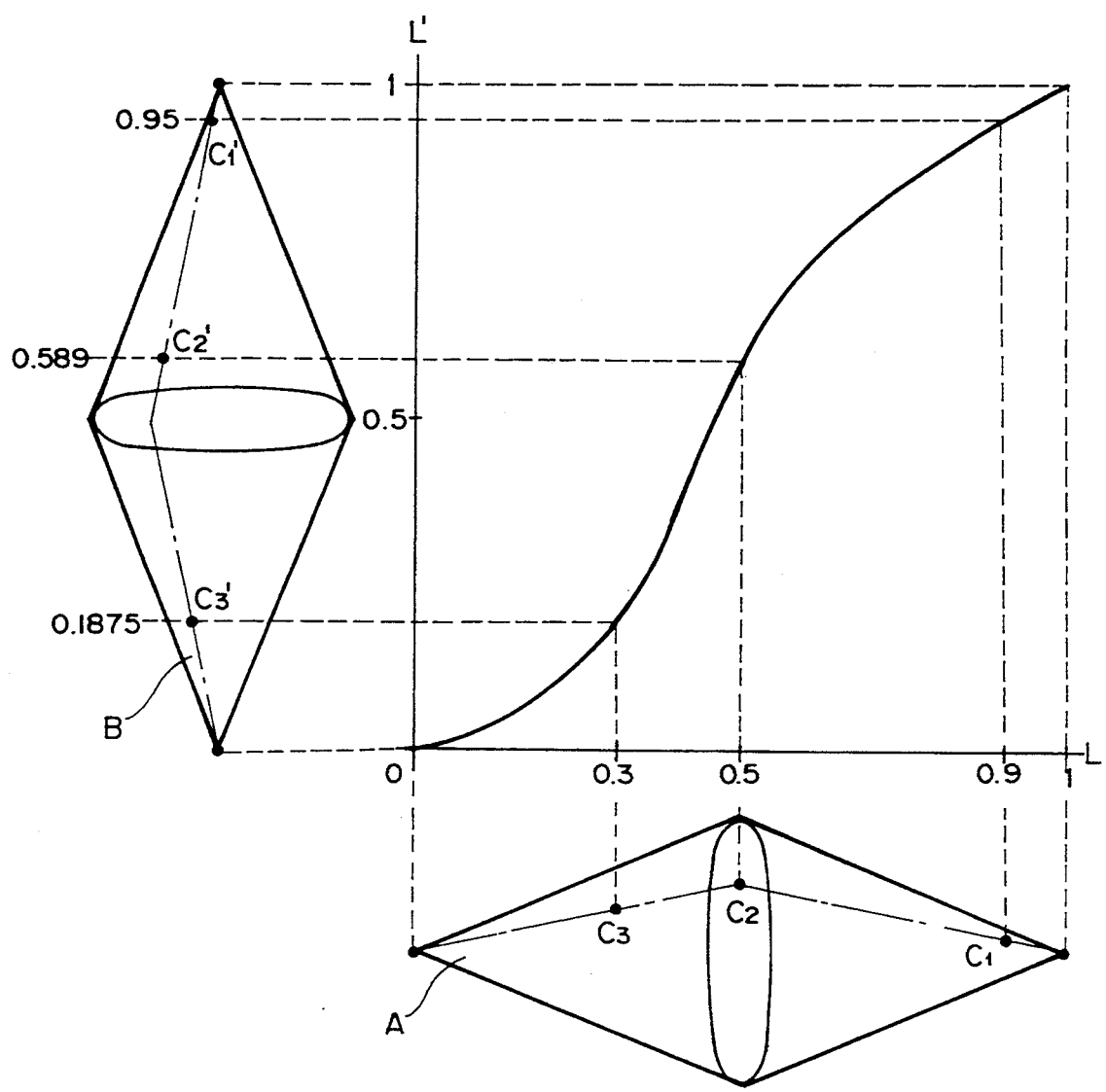
FIG. 2 is a diagram demonstrating a nonlinear transformation according to a method of the present invention.

In the next step 2, a Bezier curve setting a relationship between the luminance value I on the surface of the object calculated by the above described illumination expression (1) and the luminance value I' after a nonlinear transformation process is performed, i.e., nonlinear transformation characteristic, is defined by controlling four control points thereof. Thereby, a nonlinear transformation characteristic as shown in FIG. 2, in which the luminance value I on the surface of the object calculated by the above described illumination model expression (1) is taken along the axis of abscissas and the luminance value I' after a nonlinear transformation process is made is taken along the axis of ordinates, and the minimum value of each of the luminance values I and I' is set to 0 and the maximum value thereof is set to 1.

In the next step 3, the normal vector N at a point on the surface of the object to be displayed is calculated.

In the next step 4, the angle $\theta_j$ formed between the light-source direction vector $L_j$ and the normal vector N calculated in the above step 3 is calculated and thereafter the luminance I* is calculated by the above mentioned expression (1).

In the next step 5, the intersection (I*, I*') of the Bezier curve defined in the above step 2 and the straight line I=I* is obtained.

In the next step 6, I*' which is the value obtained in the above step 5, is set for I' and I' is set for L (lightness).

In the next step 7, color is displayed for the point with the color represented by H, L, and S.

The procedure from the step 3 to the step 7 is repeated for all points on the surface of the object to be displayed.

In the step 8, it is decided whether or not the texture of the surface of the displayed image of the object is good. When the result of the decision is NO, the routine returns to the step 2, where the nonlinear transformation characteristic is changed by controlling the four control points of tile Bezier curve and, then, the nonlinear transformation process is performed once again. When the decision of YES is reached, the procedure is ended.

When the color on the surface of the object is designated and a shading treatment is applied to the same, the change from the luminance I obtained by calculation according to the expression (1), with no specularly reflected light taken into consideration, to the luminance I', after the nonlinear transformation is performed, can be said to be a transformation from L to L' because I=L is considered to hold. Further, since H and S are fixed in the shading process, the colors given to each point on the surface of the object in the course of the shading process are those present on the heavy line of the color cube A of FIG. 2, and the colors $C_1$, $C_2$, and $C_3$ of the color cube A corresponding to the luminance I calculated by the expression (1) are transformed into the colors $C_1'$, $C_2'$, and $C_3'$ present on the heavy line of the color cube B. That is, the color $C_1$ at the lighter portion of the surface of the object is transformed into still lighter color $C_1'$ and the color $C_3$ at the darker portion of the surface of the object is transformed into still darker color $C_3'$. Thereby, an object having glossiness on its surface can be expressed in a simulated manner. Also as to the Bezier curve of the third order providing the aforesaid nonlinear transformation characteristic, the form of the curve, i.e., the nonlinear transformation characteristic, can be changed simply by controlling the four control points thereof. Therefore, texture on the surface of the object can be controlled simply by controlling the four control points.

Figure 17A:
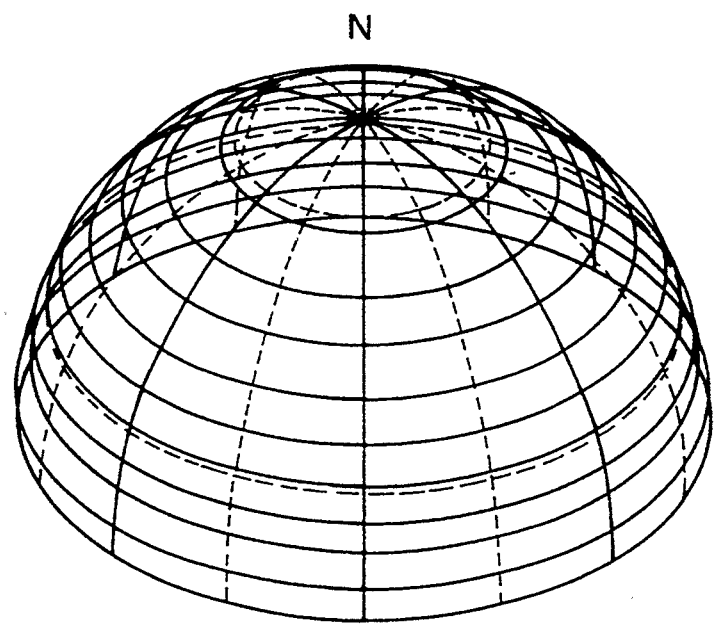
FIG. 17A and FIG. 17B are diagrams showing luminance on the surface of an object displayed by the method of the present invention.
Figure 17B:
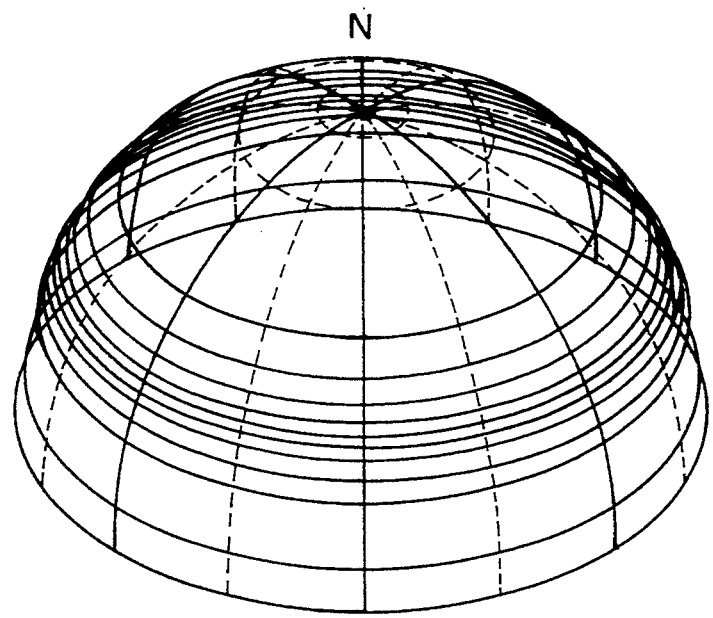

FIG. 17a and FIG. 17b are representations of display data of a spherical object, by contour lines for luminance, in which the luminance values on the surface are obtained on the assumption that the light source is located above the north pole (N) of the sphere, i.e., at the top of the drawing.

In FIG. 17a, the light of the light source was subjected to a linear transformation in order to obtain the luminance values on the surface of the object. As a result, the luminance value on the surface of the sphere is gradually changed as the angle formed between the light source and the surface changes, and hence, the display is provided with such natural glossiness as would be obtained when the light source were at infinity.

On the other hand, in FIG. 17b, the light of the light source was subjected to a nonlinear transformation in order to obtain the luminance values on the surface of the object. As a result, the portion with high luminance are widely expanded around the north pole and the displayed luminance is sharply lower around medium latitudes. Because of this, the sphere is seen as if the light source were a spot light source, the light source were located just above the north pole, or the sphere were formed of a glossy surface.

Figure 3:
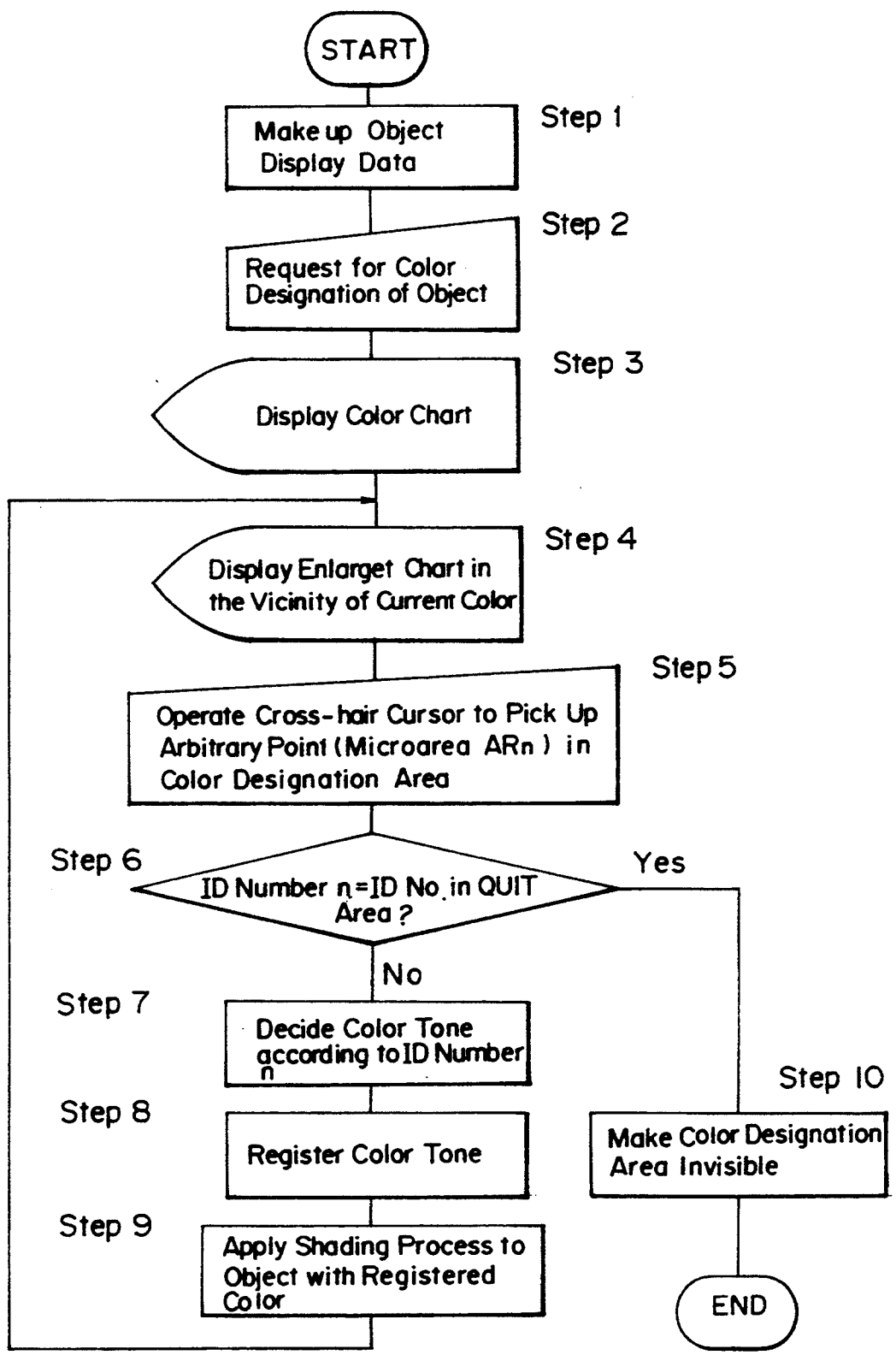
FIG. 3 is a flow chart showing steps for designating color of an image to be displayed.

Then, color designation for the surface of the body is performed according to the procedure shown in the flow chart of FIG. 3.

Figure 4:
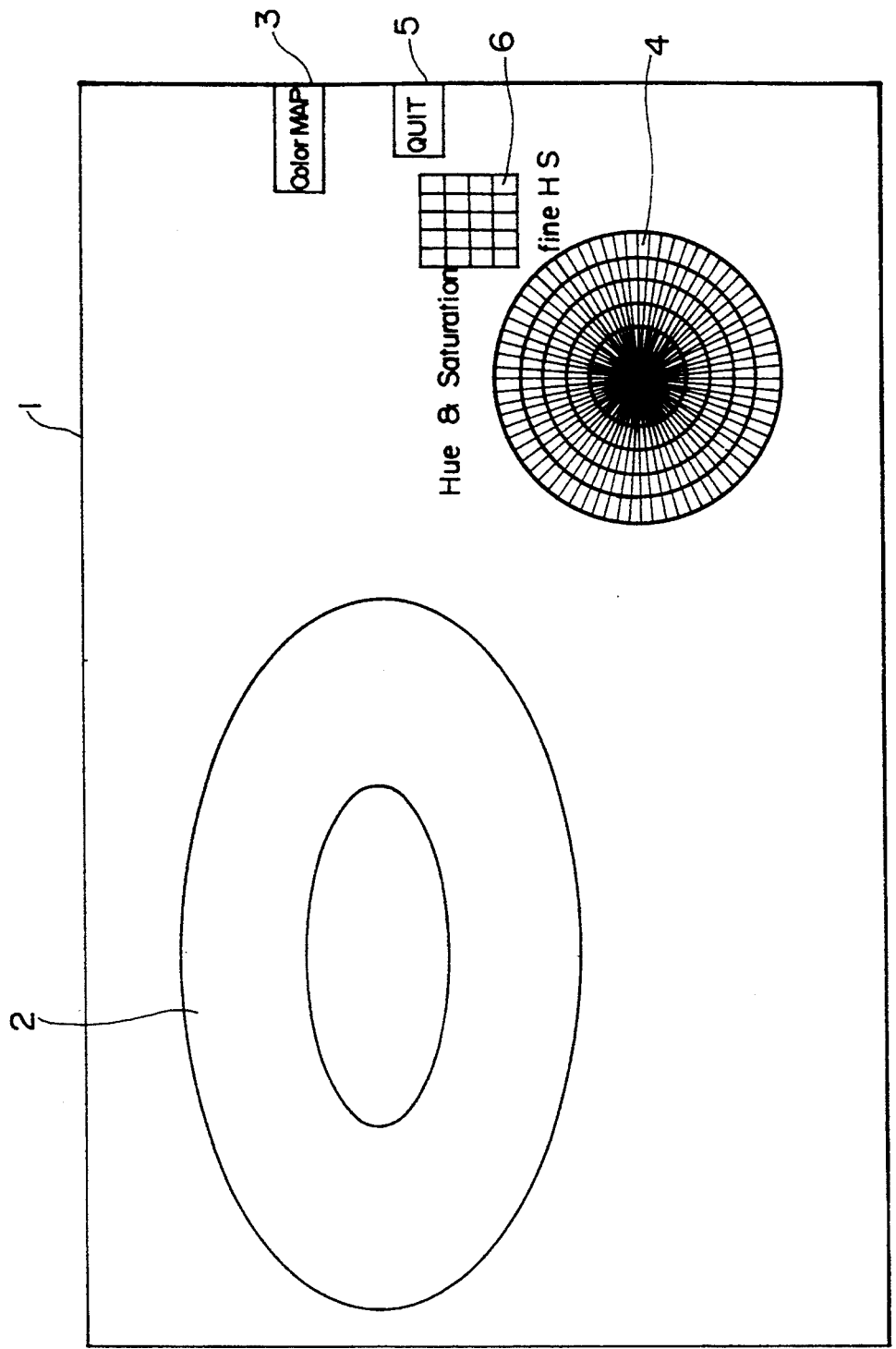
FIG. 4 is a diagram showing display screen contents when color of an image to be displayed is designated according to the steps of the flow chart of FIG. 3.

In the step 1 of the flow chart of FIG. 3, display data is made up and an image 2 of the object is displayed on the display screen 1 in a line drawing as shown in FIG. 4.

In the display screen 1, there is provided a display area (COLOR MAP) 3 for requesting color tone designation, and when the request for color tone designation is accepted (step 2), the routine advances to the step 3.

In the step 3, a color chart, i.e., a cross-section at a preset value of lightness (for example 50%) of a color cube of HLS (Hue, Lightness, Saturation) representation, for example, which has three elements of color of hue, lightness, and saturation along its coordinate axes, is displayed in a circular display area 4 for color designation and also a QUIT area 5 for ending the color designation is displayed.

The circular display area 4 is divided into microareas $AR_0$, $AR_1$, $AR_2$, ..., $AR_m$ obtained by dividing the circular area, for example, into 11 divisions in the radial direction and into 72 divisions in the circumferential direction. All colors with the lightness of 50%, with saturation changing from 0% to 100% in the radial direction from the center of the circle to the circumference, and with hue changing from 0° to 360° in the circumferential direction are allocated to the microareas $AR_0$, $AR_1$, $AR_2$, ..., $AR_m$ one after another.

Figure 5:
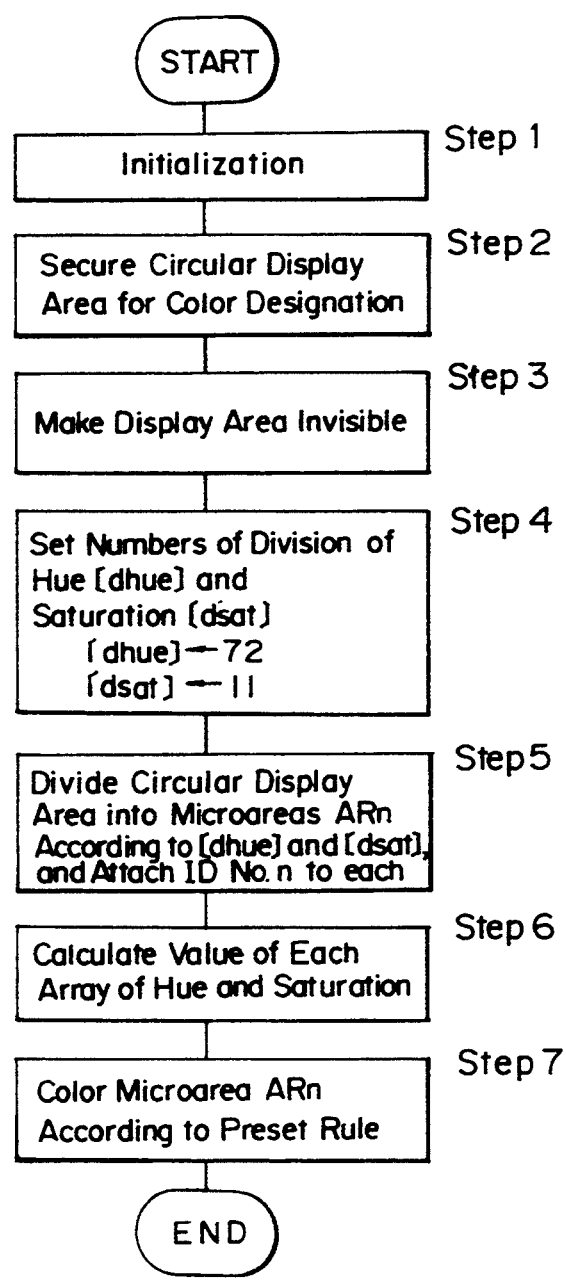
FIG. 5 is a flow chart showing steps for producing a display area for the above described color designation.

The display of the circular display area 4 in the step 3 is displayed for example, according to the procedure shown in the flow chart of FIG. 5.

That is, in step 1 of FIG. 5, various settings are made.

In step 2, the circular display area 4 is secured.

In step 3, the circular display area 4 secured in the step 2 is made invisible.

In step 4, the number of divisions of the circular display area 4 in its circumferential direction, i.e., the number of divisions of hue [dhue] is set to 72 and the number of divisions of the same in its radial direction, i.e., the number of divisions of saturation [dsat] is set to 11.

In step 5, the circular display area 4 is divided according to the number of divisions [dhue] and [dsat] set up in the step 4 into microareas $AR_0$, $AR_1$, $AR_2$, ..., $AR_m$ and each microarea is given an ID number.

In step 6, each value in the arrays of hue and saturation is calculated.

In step 7, the microareas $AR_0$, $AR_1$, $AR_2$, ..., $AR_m$ are colored according to preset rules.

Now, the rules for coloring the microareas $AR_0$, $AR_1$, $AR_2$, ..., $AR_m$ will be described taking the example case where the number of divisions of hue [dhue] is set to 10 and the number of divisions of saturation [dsat] is set to 11.

Figure 6:
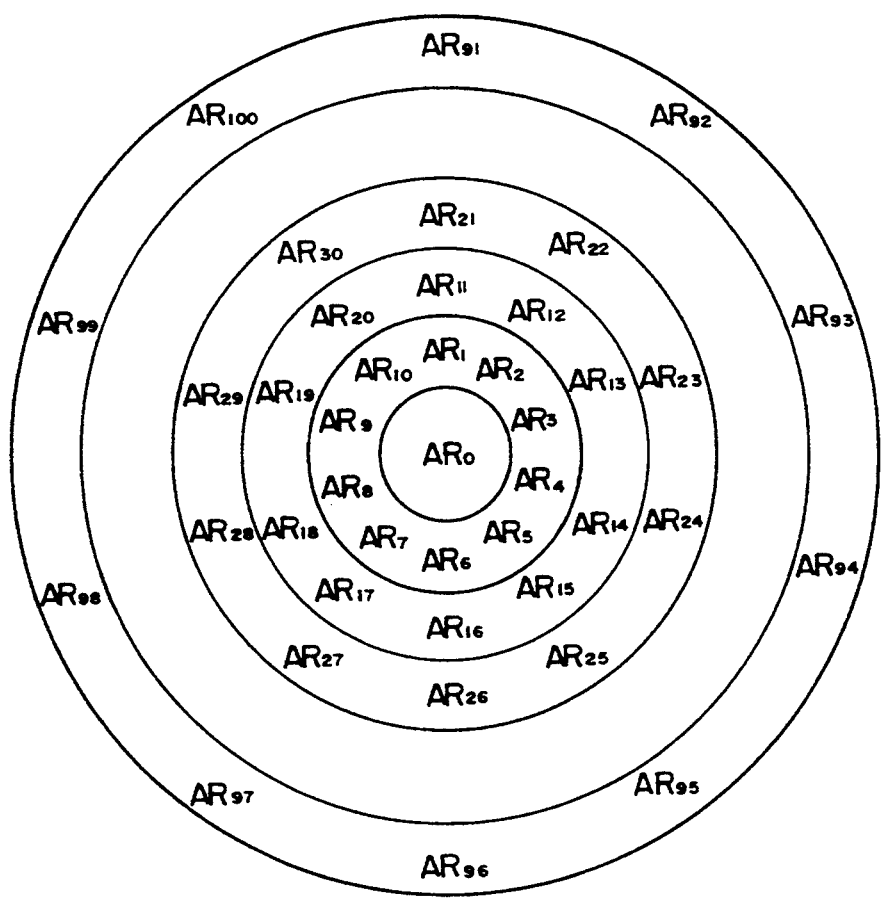
FIG. 6 is a diagram showing a state of ID numbers distributed over the display area for color designation.

In this case, the circular display area 4 is divided into 101 microareas $AR_0$, $AR_1$, $AR_2$, ..., $AR_{100}$ as shown in FIG. 6. The area within the circle of the smallest radius is designated as microarea $AR_0$ and given ID No.[0]. In the area on the interior of the circle of the second smallest radius, they are designated as microareas $AR_1$, $AR_2$, ..., $AR_{10}$ and given ID Nos.[1], [2], ..., [10] in the circumferential direction. In the area on the interior of the circle of the third smallest radius, they are designated as microareas $AR_{11}$, $AR_{12}$, ..., $AR_{20}$ and given ID Nos.[11], [12], ..., [20]. ID numbers are given to the remaining microareas in like manner, and in the area on the interior of the circle of the largest radius, they are designated as microareas $AR_{91}$, $AR_{92}$, ..., $AR_{100}$ and given ID Nos.[91], [92], ..., [100] in the circumferential direction.

Figure 7:
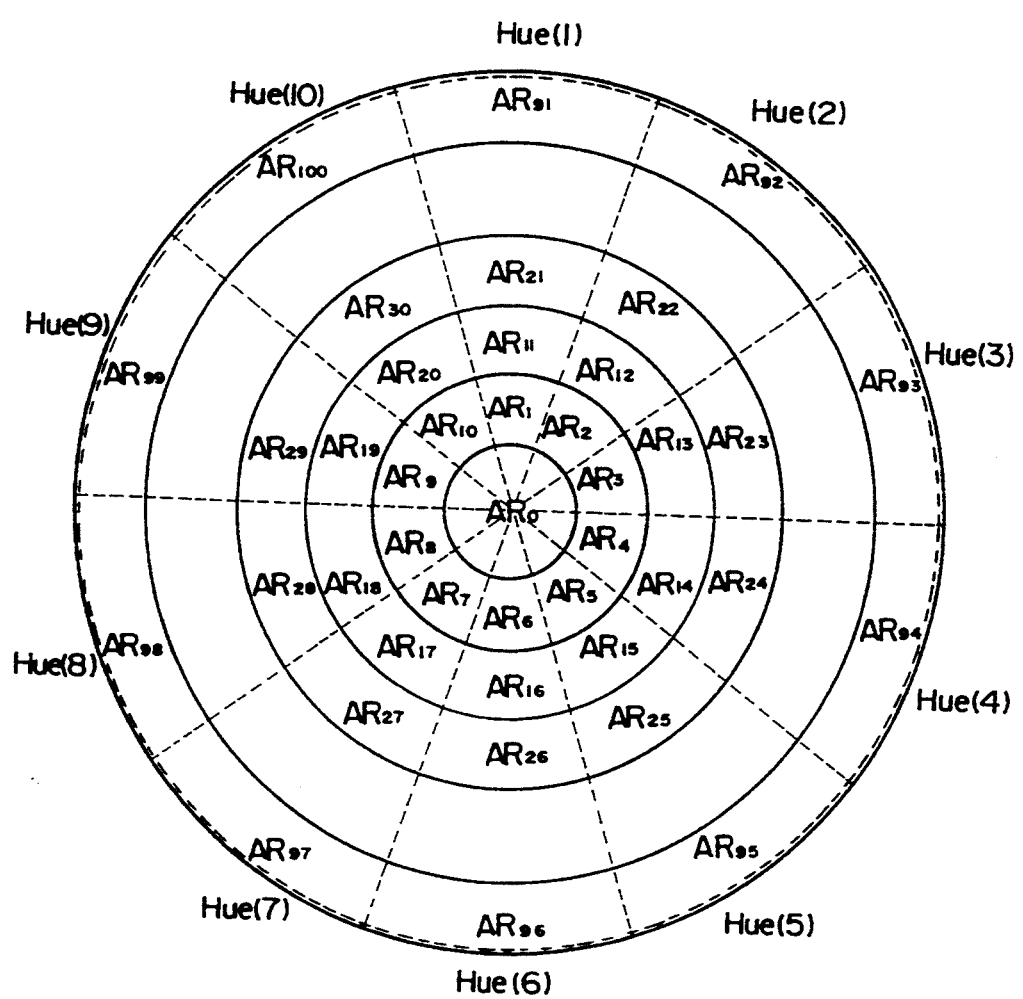
FIG. 7 is a diagram showing a state of elements of hue distributed over the display area for color designation.

For the array of elements of hue, i.e., Hue(h) [Hue(1), Hue(2), ..., Hue(10)], allocated to the divisions in the circumferential direction of the circular display area 4 as shown in FIG. 7, the values of hue are defined in increments of 360°/No. of divisions [dhue=10], i.e., 36°, as shown in Table 1.

TABLE 1

| Array of Hue | |
|---|---|
| Array of Elements Hue (h) | Values of Hue (Unit: degree) |
| Hue (1) | 0 (360) |
| Hue (2) | 36 |
| Hue (3) | 72 |
| Hue (4) | 108 |
| Hue (5) | 144 |
| Hue (6) | 180 |
| Hue (7) | 216 |
| Hue (8) | 252 |
| Hue (9) | 288 |
| Hue (10) | 324 |

Figure 8:
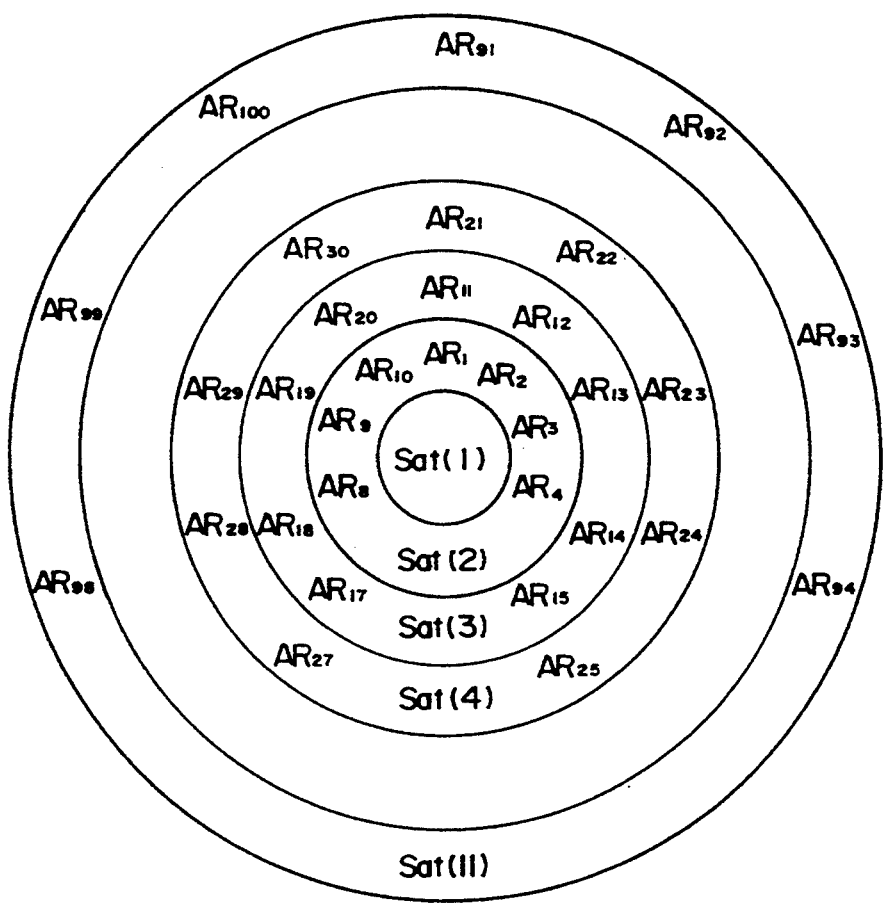
FIG. 8 is a diagram showing a state of elements of saturation distributed over the display area for color designation.
Figure 9:
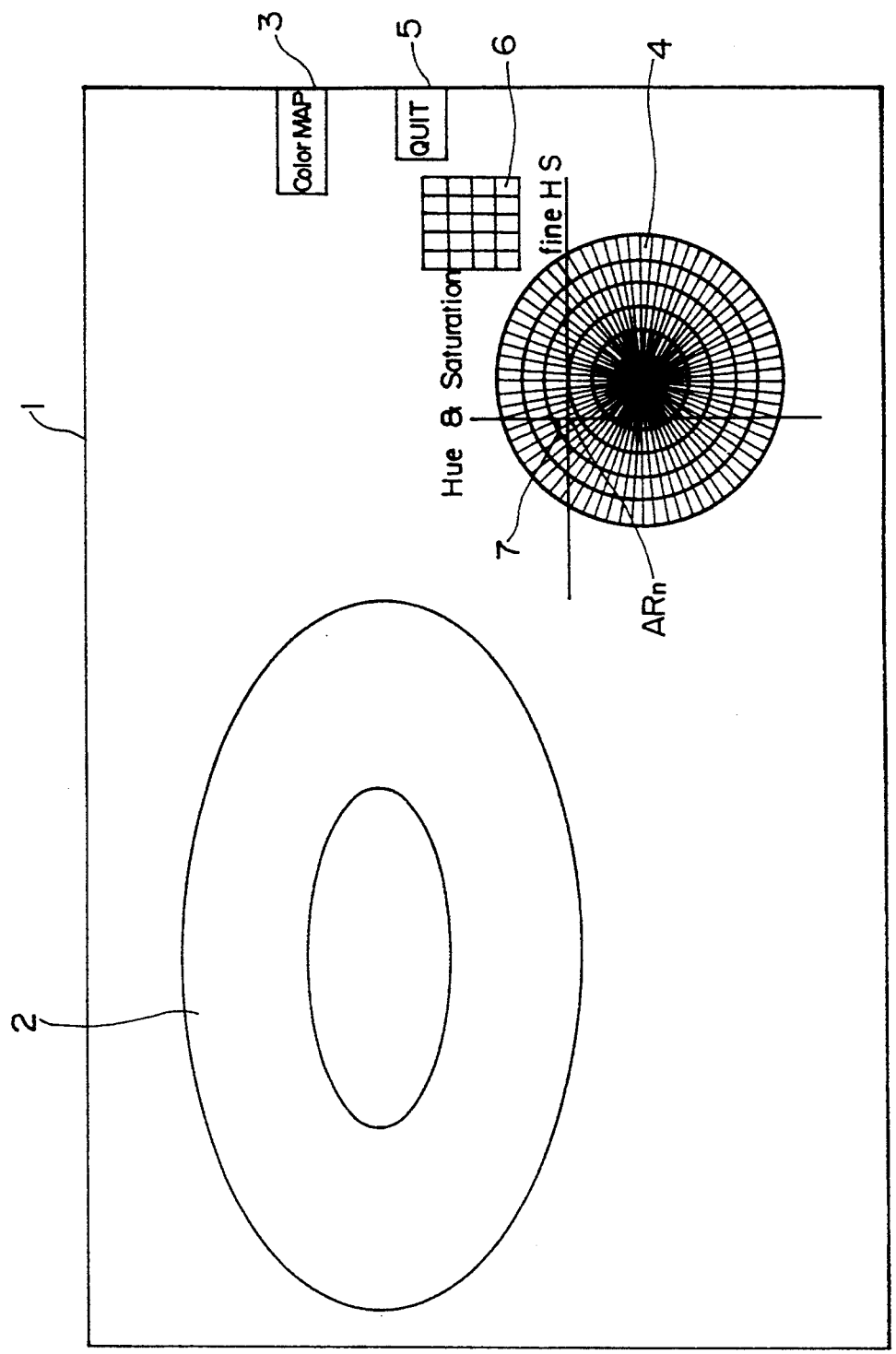
FIG. 9 and FIG. 10 are diagrams showing states of a cursor operated in the display area for designating a color.
Figure 10:
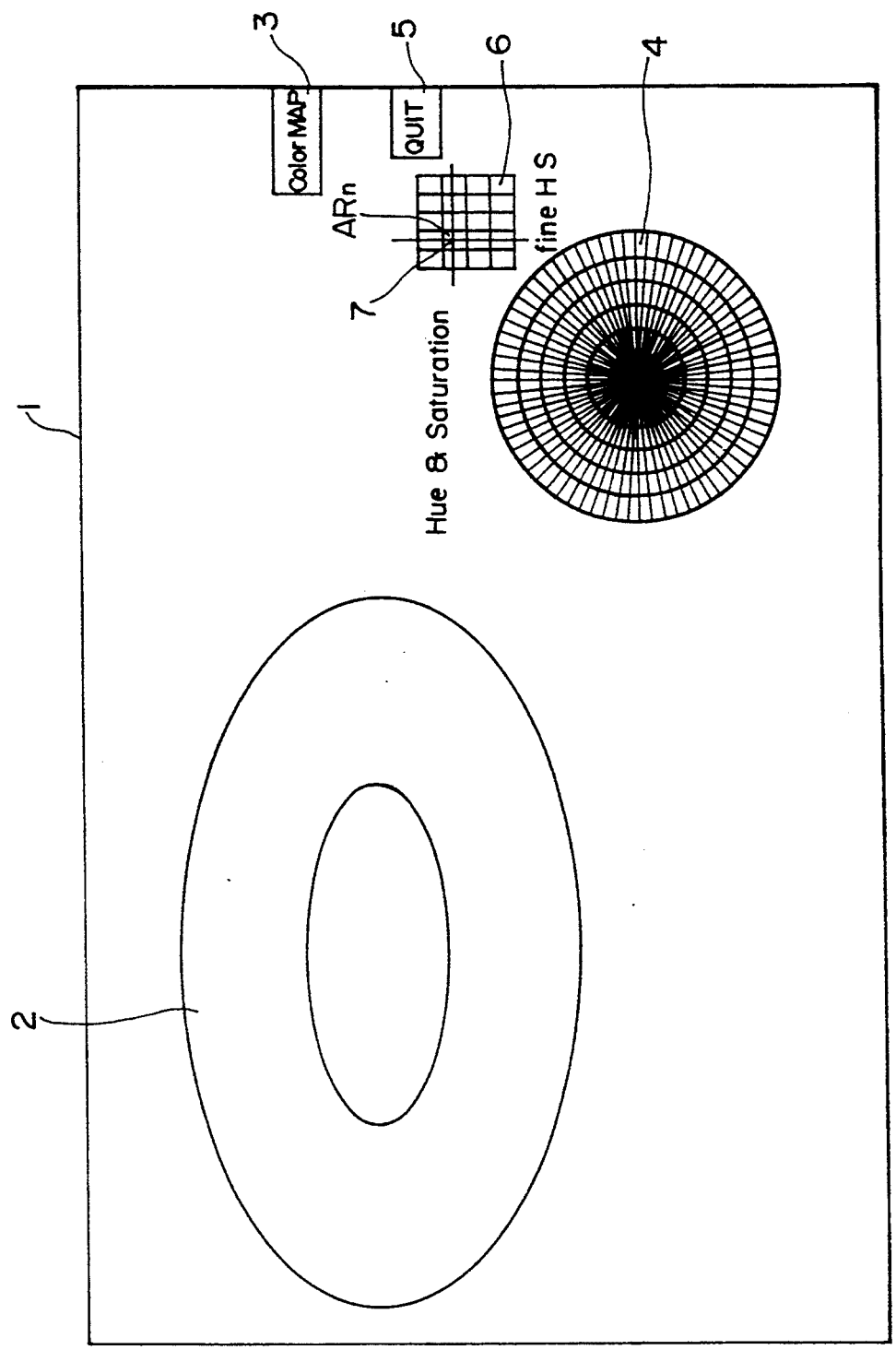
Figure 11:
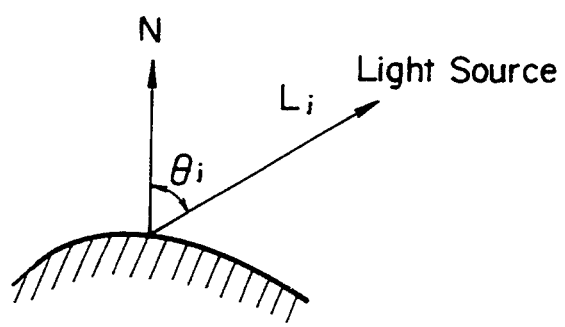
FIG. 11 and FIG. 12 are diagrams useful for explaining a diffusedly reflected color model.
Figure 12:
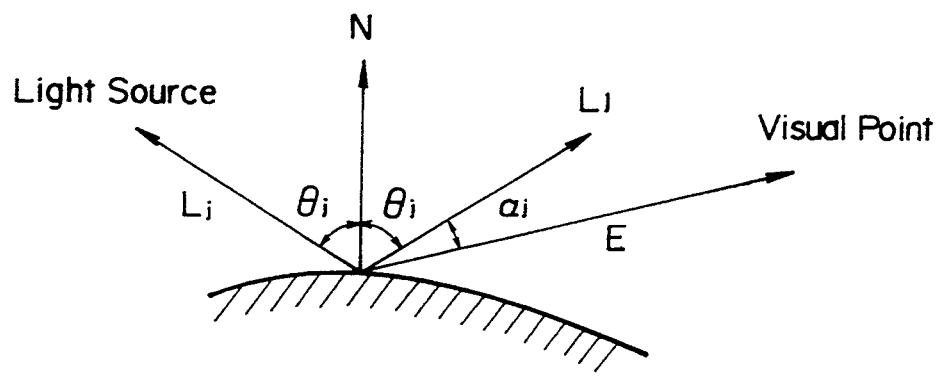
Figure 13:
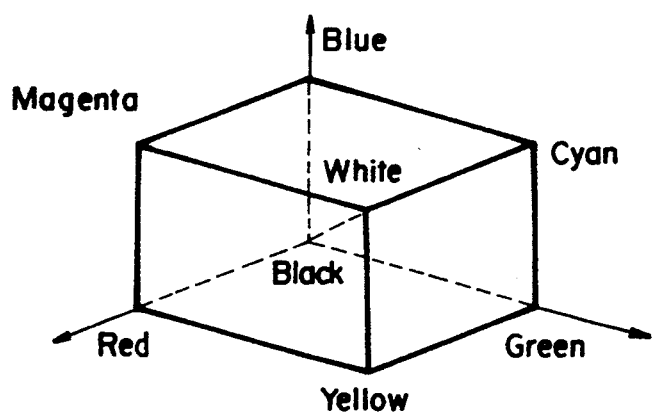
FIG. 13 is a perspective view of a color cube of RGB representation.
Figure 14:
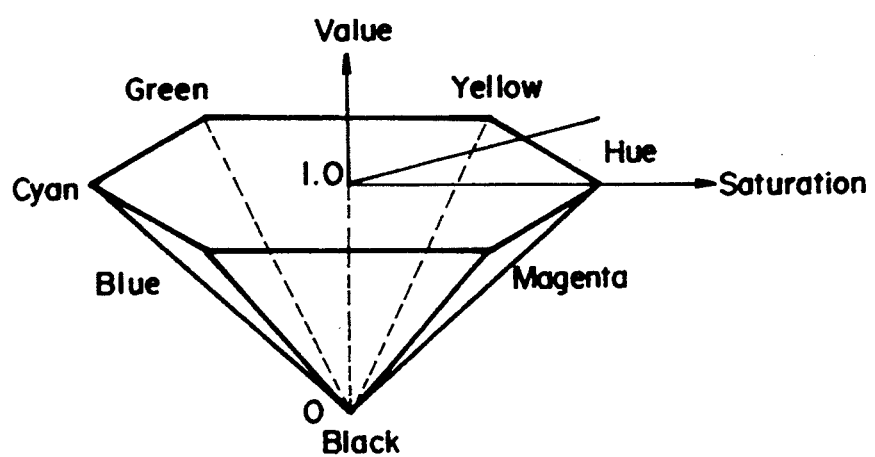
FIG. 14 is a perspective view of a hexagonal-pyramid color cube of HSV representation.
Figure 15:
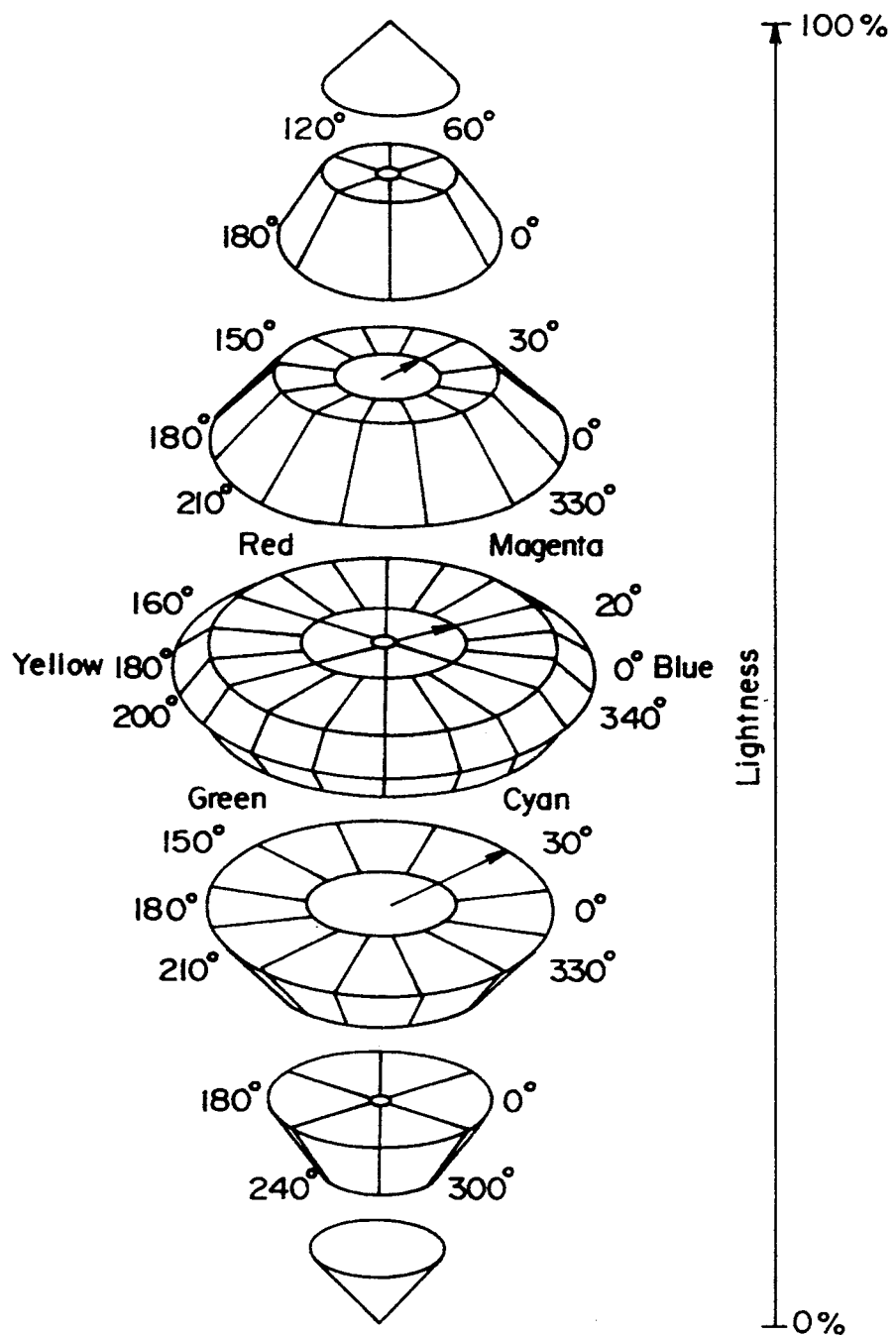
FIG. 15 is a perspective view of a hexagonal-pyramid color cube of HLS representation.
Figure 16:
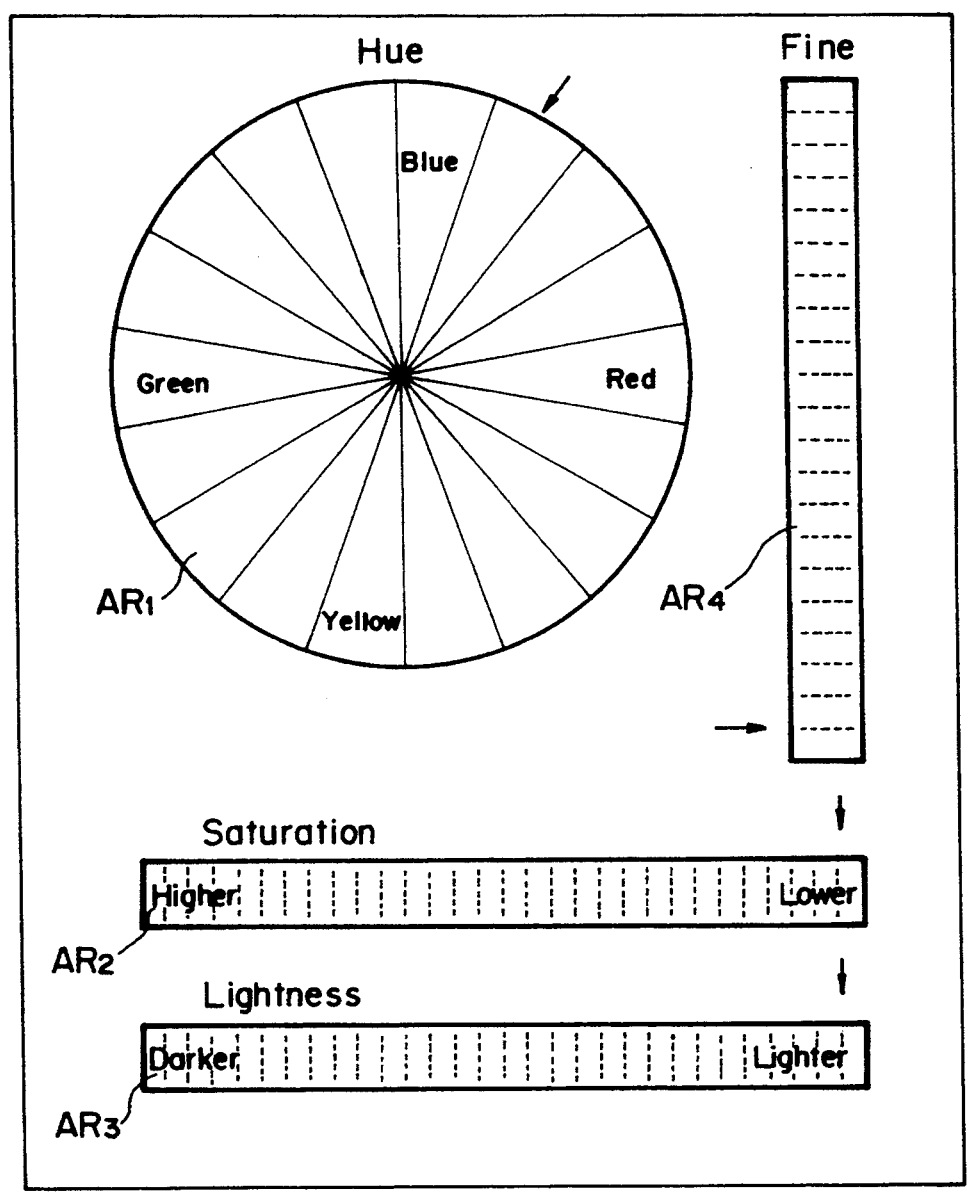
FIG. 16 shows a prior art display example of areas for color designation.

Further, as for the array of elements of saturation, i.e., Sat.(s) [Sat.(1), Sat.(2), ..., Sat.(11)], allocated to the divisions in the direction from the center to the circumference of the circular display area 4 as shown in FIG. 8, value 0% is defined for Sat.(1) and the values of saturation in increments of 100%/{No. of divisions [dsat=11]−1}, i.e., 10%, are defined for Sat.(2), Sat.(3), ..., Sat.(11) as shown in Table 2.

TABLE 2

| Array of Saturation | |
|---|---|
| Array of Elements Sat. (s) | Values of Saturation (Unit: %) |
| Sat. (1) | 0 |
| Sat. (2) | 10 |
| Sat. (3) | 20 |
| Sat. (4) | 30 |
| Sat. (5) | 40 |
| Sat. (6) | 50 |
| Sat. (7) | 60 |
| Sat. (8) | 70 |
| Sat. (9) | 80 |
| Sat. (10) | 90 |
| Sat. (11) | 100 |

According to such rules, hue and saturation of the colors allocated to the microareas $AR_0$, $AR_1$, $AR_2$, ..., $AR_m$ can be determined first by obtaining the No. s and No. h in the arrays of elements by calculating $$s = \text{integer}\left[\frac{n-1}{dhue}\right] + 2$$

$$h = \text{modular}\left[\frac{n-1}{dhue}\right] + 1$$

where
 integer ( ): a function obtaining the integer part by omitting fraction, and
 modular ( ): a function obtaining remainder in the division,
and then taking up the value corresponding to the above mentioned array of elements Hue(h) and the array of elements Sat.(s).

Incidentally, when n=0, the value of saturation is obtained as the value of the array of elements Sat.(1), i.e., 0%, and the value of hue is insignificant.

In the next step 4, an enlarged chart around the current color tone (initially, default data) is displayed in the preset square display area 6.

In the next step 5, a cross-hair cursor 7 is moved with a mouse so that an arbitrary point (microarea $AR_n$) in the circular display area 4 or the square display area 6 is picked up. Thereby, hue and saturation are selected at the same time.

In the next step 6, it is decided whether or not the ID No. [n] of the point (microarea $AR_n$) picked up in the step 5 is the same as the ID No. in the QUIT area 5, and if the result of decision is NO, the routine advances to the step 7.

In the step 7, the color tone of the color of the point (microarea $AR_n$) picked up in the step 5 is determined according to the ID No. n.

In the next step 8, the color tone determined in the step 7 is registered as the color tone of the surface of the object.

In the next step 9, the shading treatment described above according to the procedure shown in the flow chart of FIG. 1 is applied to the displayed image of the object using the color tone registered in the step 7 and then the routine returns to the above described step 4.

When the result of the decision in the step 6 is YES, the procedure moves to step 10, wherein the display areas 4, 5, and 6 are made invisible and the procedure is ended.

In computer graphics, the color of the surface of an object to be displayed is determined by a relationship between the normal vector N at the point of the object and the light source vector L, and it is expressed, in practice, as the inner product of the vectors $$N \cdot L = |N| \cdot |L| \cos \theta$$

where
 $\theta$: the angle formed between the normal vector N and the light source vector L.

The shading process in the above described step 9 is performed according to the following procedure of step 1 to step 3.

Step 1: A color table in which various colors are stored is prepared in advance, and it prescribes which number of color out of the color table is used as the color of a point based upon what numerical value the product N·L takes. As to the contents of the color table, the color tone and lightness must have been previously assigned to each color. As to the lightness, it may be arranged to change in accordance with either linear or nonlinear transformation.

Step 2: A collection of micro triangular or square plane facet approximating the surface of the object is produced.

The normal vector N of each facet is calculated and the value of N·L is obtained, and then the color corresponding to the value of the product N·L is assigned to the facet as its color.

Step 3: Since the boundary line of facets becomes noticeable when the colors of adjoining facets are different from each other, a dithering treatment is applied to gradate the color near the boundary.

What is claimed is:

1. A method for displaying an image of an object surface on a screen comprising the steps of:
   determining, based on ambient light and diffusedly reflected light models, a luminance of each point on the object surface whose image is to be displayed;
   inputting a nonlinear characteristic used for a luminance transformation;
   making the luminance transformation of the determined luminance of each point on the object surface in accordance with the nonlinear characteristic; and
   displaying the image of the object surface in accordance with the luminance transformation of the determined luminance;
   wherein said nonlinear characteristic is represented by a Bezier curve exhibiting a nonlinear characteristic defined by designation of four control points on the screen and the luminance transformation is performed according to the Bezier curve.

2. A method for displaying an image of an object surface on a screen according to claim 1, wherein
   said ambient light and diffusedly reflected light models in said determining step correspond to designated color data of the object surface whose image is to be displayed.

3. A method for displaying an image of an object surface on a screen according to claim 1 or 2, wherein
   said Bezier curve is generated in a normalized rectangular coordinate system and exhibits a nonlinear characteristic defined by two of the four control points preset at the coordinates (0, 0) and coordinates (1, 1) and the two other control points to be designated and the luminance transformation is performed according to this Bezier curve.

* * * * *